Nov. 8, 1955     E. E. ACHBERGER     2,723,101
NONCHATTERING PILOT CONTROLLED MAIN VALVE
Filed Jan. 22, 1953
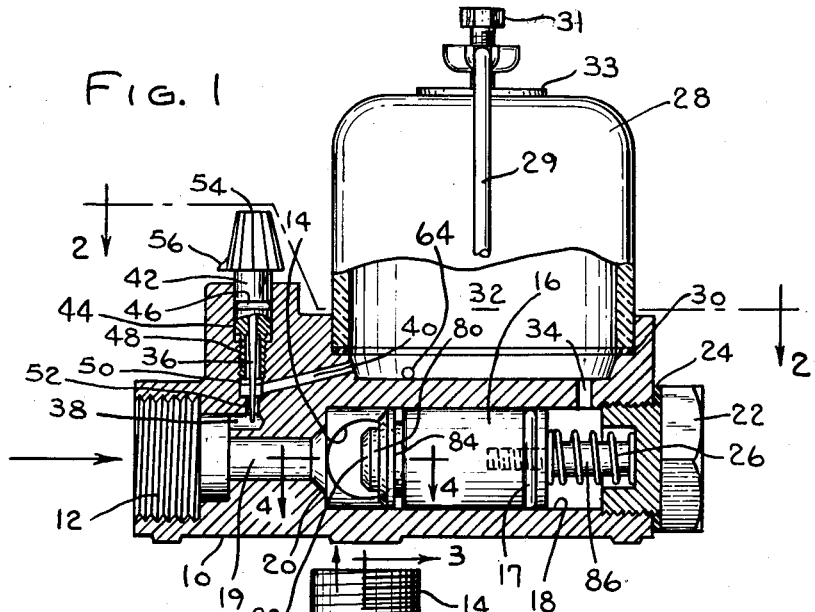
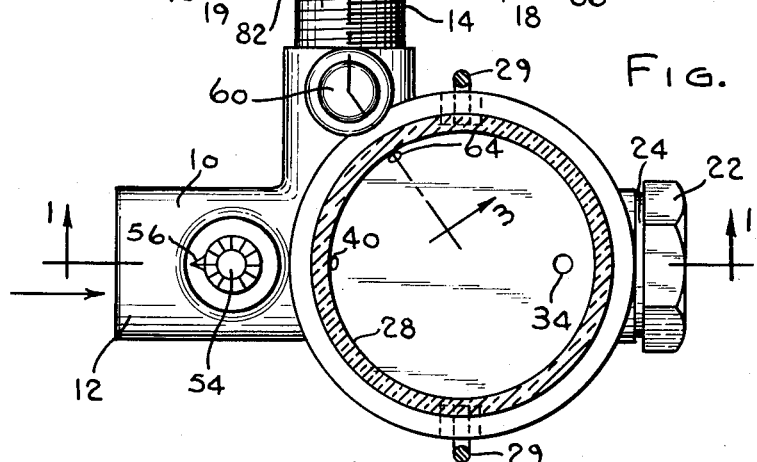
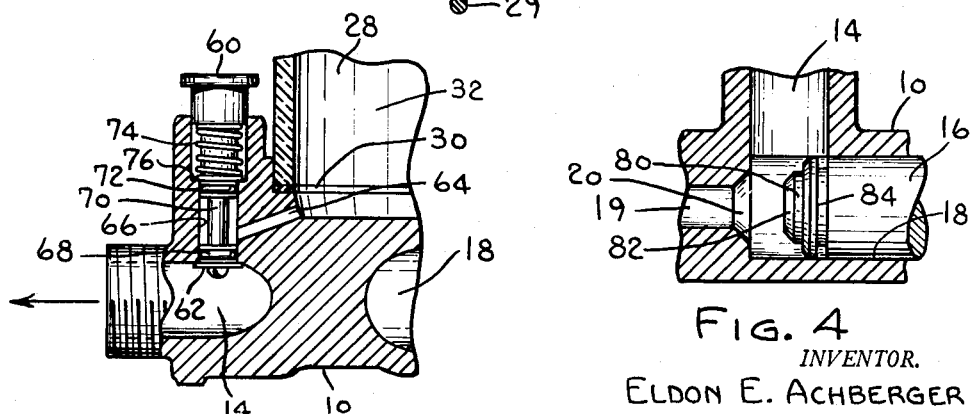
INVENTOR.
ELDON E. ACHBERGER
BY
John W. Michael
ATTORNEY

United States Patent Office 2,723,101
Patented Nov. 8, 1955

2,723,101
NON-CHATTERING PILOT-CONTROLLED MAIN VALVE

Eldon E. Achberger, Milwaukee, Wis.

Application January 22, 1953, Serial No. 332,585

7 Claims. (Cl. 251—36)

This invention relates to an adjustable, simple, accurate fluid metering device. This application is a continuation in part of my copending application Serial No. 166,032, filed June 30, 1950 and now abandoned.

An object of this invention is to provide a simple, inexpensive fluid metering device.

Another object is to provide a fluid metering device having simple parts which may be readily fabricated.

A further object is to provide a metering device in which the shut-off action is positive.

Still another object is to provide a fluid metering device which may be readily modified to meet different needs.

Other objects and advantages will be pointed out in, or be apparent from, the specification and claims, as will obvious modifications of the single embodiment shown in the drawings, in which:

Fig. 1 is a vertical section taken on line 1—1 of Fig. 2;

Fig. 2 is a section on line 2—2 of Fig. 1;

Fig. 3 is an enlarged, fragmentary cross section taken on line 3—3 of Fig. 2; and Fig. 4 is a fragmentary cross section taken on line 4—4 of Fig. 1.

Referring to the drawings in detail, casing 10 has an internally threaded inlet 12 adapted to be connected to a source of liquid or gas and an externally threaded outlet 14 adapted for connection to a hose or other conduit means, if desired. The inlet and outlet intersect at right angles and flow through the casing is regulated by an axially movable piston type plug or valve 16 located in cylinder 18 in alignment with the inlet conduit. O-ring seal 17 on the right-hand end of piston 16 prevents leakage in either direction past the valve. The inlet includes a restricted portion 19 producing a pressure drop and provided with a valve seat 20. The inlet pressure tends to open the valve and is opposed by spring 26 compressed between the rear face of the valve and threaded cap 22 which cooperates with seal 24 to seal the cylinder. The opening movement of valve 16 is limited by pin 86 mounted in the rear face of the valve and adapted to strike cap 22 when the valve is fully open as in Fig. 1. As will appear more fully hereinafter, pressure also acts on the rear of valve 16 in opposition to the inlet pressure.

Glass cup 28 is held in the casing by bail 29 and nut 31 acting on plate 33 on the top of the cup. The cup is sealed by means of rubber annulus 30 to provide a pressure-tight chamber 32. Conduit 34 connects chamber 32 and cylinder 18 so pressure in the chamber acts on the rear of the valve. At the start of a metering cycle the pressure in chamber 32 is low and valve 16 is open. Liquid from the inlet is metered into chamber 32 at a desired rate to increase the pressure in the chamber until sufficient to close valve 16.

Tapered metering pin 36 regulates flow through conduit 40 to chamber 32 from well 38 on the high pressure side of the inlet restriction. The end of the tapered metering pin is anchored in cylindrical base 42 which rotatably fits in hole 44 and carries an O-ring seal 46 to prevent flow from the casing at this point. Pin 36 is generally co-axial with externally threaded sleeve 48 threadably engaging tapped hole 50 in the casing. The free end of pin 36 projects into orifice 52 connecting well 38 and conduit 40. Since the end of the metering pin is remote from the anchor, a small amount of resultant play insures alignment of the pin with the orifice. Knob 54 may be turned to adjust the threaded sleeve and vary the axial position of pin 36 with respect to the orifice to change the rate of flow. Pointer 56 is provided on knob 54 to aid setting the pin.

Chamber 32 may be vented to the outlet by pushing knob 60 down to open valve 62 to outlet 14 and permit flow through intersecting conduits 64 and 66. Valve 62 includes an O-ring 68 and is mounted on shank 70 carried by knob 60. The upper end of shank 70 is sealed by O-ring 72 to prevent flow past the knob. Spring 74 is compressed between shoulder 76 and the underside of knob 60 to urge the valve closed. When valve 62 is opened the pressure in chamber 32 will force the liquid in the chamber through conduits 64, 66 to the outlet 14. The amount of liquid forced from the chamber depends upon the pressure differential between the chamber and the outlet.

Assuming chamber 32 to be empty and vent valve 62 closed, inlet pressure will open valve 16. Liquid now flows from outlet 14. A considerable pressure drop between the inlet and the outlet is caused by inlet restriction 19 and the right angle turn in the flow path. Since the entrance to and exit from restriction 19 are angular, flow is turbulent and further loss of pressure is incurred. Similarly, the abrupt right angle turn sets up turbulent flow and pressure loss. This pressure drop between the inlet and the outlet is of importance when chamber 32 is vented.

Liquid is bled from the inlet to chamber 32 past metering pin 36 at a selected rate. As chamber 32 fills, the air in the chamber is compressed and pressure builds up. The chamber pressure acts on the rear of valve 16 in the valve closing direction. The valve is held open by the static pressure acting on the entire valve face (due to the inlet restriction, this static pressure is less than the inlet pressure) and the velocity pressure on the valve face occasioned by the right angle turn. Thus the total pressure on the valve face is higher than the static pressure. Therefore, the chamber pressure and the spring pressure acting on the rear of the valve must exceed the total pressure to close the valve. When the valve seats on restriction 20, inlet pressure acts on the small face of the valve while chamber pressure acts on the rear face. This area differential insures that the valve remains seated after it has closed. A slight pressure increase will not operate to open the valve after it has closed.

As the valve closes, the effective size of the outlet is progressively decreased, causing the inlet pressure to increase. The increasing inlet pressure tends to prevent the valve from seating and would ordinarily cause incomplete closure or valve chatter when seating. The instant valve overcomes this tendency by reducing the length of the restricted flow path during the seating operation and by permitting a slight leakage past the valve when seating. Thus the annular notch 80 in the frusto conical nose portion provides an enlarged space when adjacent the seat so the liquid flows through a small restriction for the length of the frusto conical nose portion 82. The increasing inlet pressure acts, therefore, on a smaller area and the rate of pressure increase is kept relatively low since the pressure differential required to force the liquid through a short restriction is less. The slight leakage is provided by the peripheral groove 84 in the valve body. This groove registers with the outlet at all times when the valve is seated and will receive the small amount of liquid leaking along the body of the valve. The groove, therefore, provides a secondary flow path as the outlet is blanked off. In this respect the groove is similar to some check valves which are provided with a small hole but this valve, when fully seated, will not leak while those with the hole will leak.

As pointed out above, pin 86 limits valve opening movement to the position shown in Fig. 1. In this position and when the valve is closed groove 84 communicates with the outlet passage. This has been found necessary to successful operation of this valve and it is principally in this respect that the present disclosure differs from my copending application Ser. No. 166,032 which allows movement of groove 84 past the outlet opening. If the groove 84 does not communicate with the outlet when the valve is open the valve chatters when closing against high pressures and very often fails to stay closed. While the principle involved is not known to me, the present valve, limiting the open position to one in which groove 84 communicates with the outlet at all times, closes without chatter and remains closed after seating. I am at a loss to explain this phenomenon but extensive tests demonstrate both the need for the groove and the need for the groove communicating with the outlet at all times. The coexistence of these conditions spells the difference between a reliable valve and an unreliable valve.

When the valve is seated, the pressure in the outlet is atmospheric while chamber pressure approximately equals inlet pressure. Therefore, when vent valve 62 is opened, the chamber pressure forces liquid into the outlet. This decreases the chamber pressure and the valve, upon becoming unbalanced, opens. The chamber vent is then closed and the device recycles.

If the inlet pressure varies, the time of each cycle will be varied since the pressure drop across the needle valve affects the time required to obtain valve closing pressure. If the pressure drops, the cycle will be longer to compensate for the decreased rate of flow. This device will pass a substantially constant quantity for each cycle even though the inlet pressure varies.

Spring 26 has a low spring rate and is employed principally to guard against valve sticking. A stiffer spring can be used, of course, when indicated. This device has, however, functioned in a completely satisfactory manner without any spring acting on valve 16. It should be understood, therefore, that this invention is not limited to use of a spring.

The structural simplicity of this device should be readily appreciated. All casting and machining operations are simple and straightforward. By having the inlet pressure act directly on the valve, the valve structure is reduced to the simplest form. Since compressed air is made to do the work of evacuation, the valve stroke is kept short and the capacity of the meter can be readily changed to meet specific requirements by changing the size of the cup 28 to change the volume of the air chamber. If the chamber volume is increased and other factors remain constant, a longer period will be required to reach the closing pressure and the meter will pass more liquid. Thus the same basic unit can meet many requirements. Since compressed air is necessary for evacuation of the chamber, it will be appreciated that the conduits opening into the chamber must enter at the bottom.

Outlet 14 is threaded to allow conduit means to be coupled thereto. Thus a hose having a lawn sprinkler may be coupled to the outlet. With this arrangement, a lawn may be watered more or less automatically. Thus the device may be set to deliver water for a sufficient period to soak the ground as desired. This period of operation will vary with inlet pressure variations, but the delivered quantity will remain constant on recycling. The device may be set and left to shut off automatically, thus avoiding waste of water and allowing the home owner to go to bed or leave the house.

When a hose and sprinkler are connected to the outlet, the pressure in the outlet 14 of casing 10 will be higher than when outlet 14 discharges to atmosphere. It will be apparent that the amount of water expelled from chamber 32 when the chamber is vented will be affected. Assuming valve 16 has seated, the outlet pressure is substantially atmospheric. When the chamber is vented, water is expelled and the pressure drops to unbalance valve 16 and re-establish flow. The outlet pressure rises due to the restrictions at the sprinkler. This new outlet pressure, however, is less than the inlet pressure and is less than the chamber pressure before venting. Therefore, water is expelled from the chamber until the outlet and chamber pressures balance. The vent may now be closed and the device recycled. The needle valve would require adjustment to compensate for the increased outlet pressure and the partial (instead of complete) evacuation of chamber 32. Other than this adjustment, operation is the same as described above with reference to an unrestricted outlet.

One of these devices has been set to pass any quantity between one quart and seven hundred gallons on each cycle. After the device has been set to pass a given quantity it will pass that quantity on each cycle. It will be noted that the vent valve is biased to its seat to insure against inadvertently leaving the vent open and consequently preventing operation of the meter. If desired, however, the needle valve may be closed to prevent filling the pressure chamber, thus permitting the meter to be by-passed when desired (as when sprinkling by hand).

This device permits of use in other environments. For example, it may be used in filling washing machines or metering flow in washing photographic materials. Other uses will readily occur. Similarly, structural changes will be suggested to those skilled in the art. While the above description refers to liquid flow it will be appreciated that the principles are equally applicable to gases and such uses are within the scope of this invention. For these reasons I wish to be limited only by the scope of the claims.

I claim:

1. A fluid metering valve comprising, a casing having a valve bore, an inlet to said bore and including a valve seat, a piston valve reciprocally mounted in said chamber and having a face adapted to seat on said seat, an outlet from said chamber, a peripheral groove in said piston valve, means limiting movement of said valve so that said groove communicates with said outlet at all times, an air chamber in said casing, conduit and metering means for metering flow from the inlet to the air chamber, a conduit for allowing the pressure in the air chamber to act in the rear of the valve in the valve closing direction, and means for venting the air chamber.

2. A metering valve according to claim 1 in which said valve face is frusto conical and has an annular notch therein.

3. A fluid metering valve comprising, a casing having a cylindrical valve bore, an inlet to the bore and including a valve seat, an outlet from the bore, a cylindrical piston valve reciprocally mounted in the bore and having a face adapted to cooperate with said seat in regulating flow from the inlet to the outlet, the inlet pressure acting on said face in the valve opening direction, means for metering flow from the inlet to said bore behind said valve to gradually build up the pressure behind the valve to ultimately seat the valve, a peripheral groove in the piston valve, means for limiting movement of the valve between extreme positions in which the groove communicates with the outlet, and means for relieving the pressure rearwardly of the valve.

4. A metering valve according to claim 3 in which said valve face is frusto-conical and has a circumferential notch in the conical face.

5. A metering valve according to claim 4 in which said pressure relieving means vents the bore behind the valve to the outlet.

6. A metering valve according to claim 3 in which said valve seat is of reduced diameter to restrict flow between the inlet and the bore and the area of the valve face subjected to inlet pressure when the valve is seated is substantially less than the valve area subjected to the pressure in the bore behind the valve.

7. A metering valve according to claim 6 in which the valve face is frusto-conical and has a peripheral notch in the conical face.

References Cited in the file of this patent

UNITED STATES PATENTS

| | | |
|---|---|---|
| 711,349 | Schlaepfer | Oct. 14, 1902 |
| 868,606 | Landell | Oct. 15, 1907 |
| 1,714,591 | Darrow | May 28, 1929 |
| 2,134,803 | Rose | Nov. 1, 1938 |

FOREIGN PATENTS

| | | |
|---|---|---|
| 679,246 | Germany | 1939 |